Feb. 21, 1956    W. A. RAY ET AL    2,735,445
RELIEF VALVE
Filed April 30, 1951
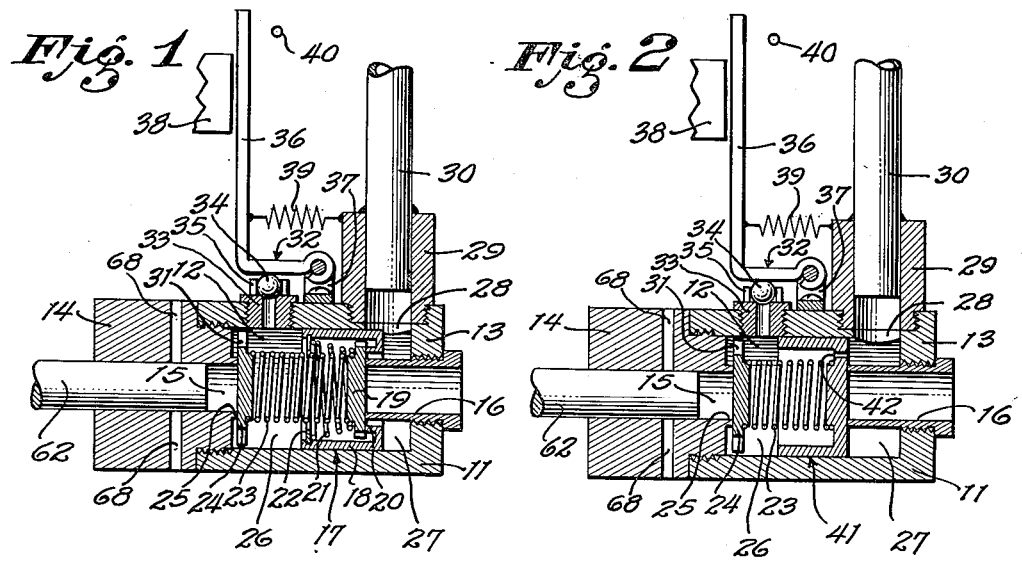
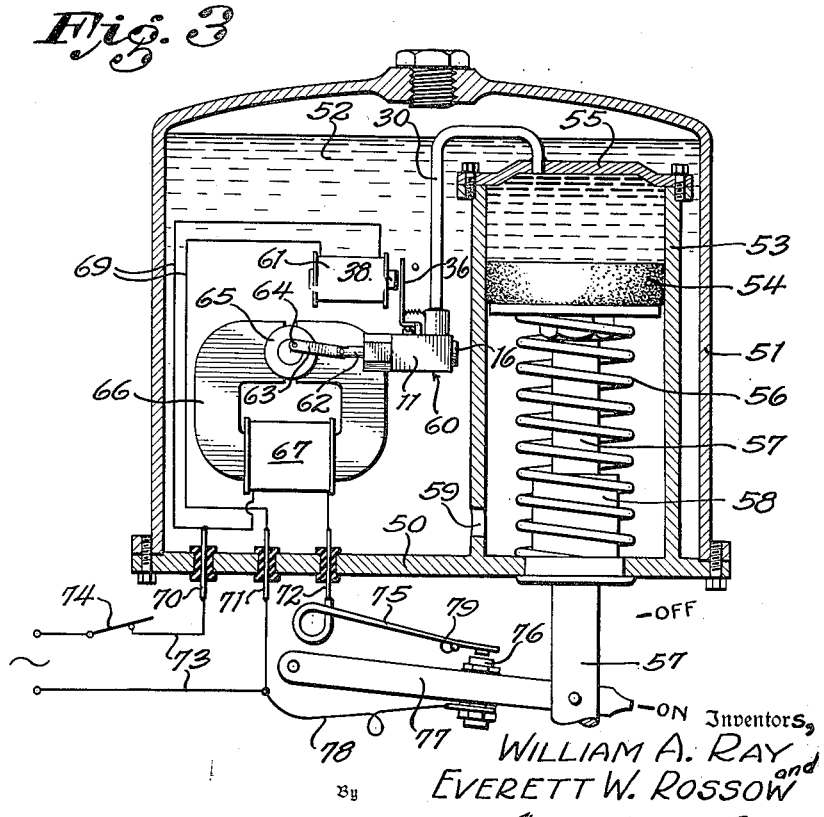
Inventors,
WILLIAM A. RAY and
EVERETT W. ROSSOW
By John H. Rouse,
Attorney

United States Patent Office 2,735,445
Patented Feb. 21, 1956

2,735,445

RELIEF VALVE

William A. Ray, North Hollywood, and Everett W. Rossow, Glendale, Calif., assignors to General Controls Co., Glendale, Calif., a corporation of California Application April 30, 1951, Serial No. 223,702

4 Claims. (Cl. 137—620)

This invention relates to relief-valve structures adapted for use in the control of hydraulic motors for operating or positioning apparatus such as fluid control valves, dampers, or the like. The type of hydraulic motor in connection with which the valve structures of the present invention have particular utility is one in which the hydraulic fluid is supplied to the motor at low rate, as by a small electrically operated pump, to effect operation of the motor in one direction, and in which discharge of the fluid from the motor, to effect its operation in the opposite direction, is controlled by a small electrically operated relief valve; operation of the hydraulic motor accordingly being relatively slow in both directions. Examples of such hydraulic operators are disclosed in Ray Patents No. 2,276,591 and No. 2,399,294.

In some instances it is desirable that the fluid be discharged from the motor at high rate, as, for example, to effect rapid closing of a valve or damper operated by the motor, and it is an object of our invention to effect such accelerated discharge of the fluid without increasing consumption of electricity; this object being accomplished in general, by operating the relief valve hydraulically under the control of an electrically operated pilot valve.

For full understanding of the invention, and further appreciation of its features and advantages, reference is to be had to the following detailed description and accompanying drawing, and to the appended claims.

In the drawing:

Figure 1 is a sectional view of a relief-valve structure embodying our invention;

Figure 2 is a similar view of a slightly modified form of valve structure according to the invention; and Figure 3 is a sectional, and more-or-less schematic, view of a hydraulic operating system which includes the valve structure of Fig. 1 or Fig. 2.

Referring first to Fig. 1 of the drawing, the numeral 11 indicates a casing having an elongated cylindrical chamber, generally indicated at 12, which is bounded at one end by a wall 13 and has, threaded in its opposite end, a fitting 14 having an axial bore or passage 15 therein. The end wall 13 is drilled and threaded for a tubular fitting 16 whose inner end projects within the chamber 12.

In the chamber 12 is a piston member 17 consisting of a hollow outer part 18 and a disk-like inner part 19 which is maintained in engagement with an inner shoulder or seat 20 on the right-hand end of the outer part 18 by the force of a conical spring 21 compressed between disk 19 and a ring 22 snapped in a recess at the other end of the outer part.

The piston member 17 is urged toward the right, so that its disk-like part 19 is normally seated on the inner end of the tubular fitting 16, by the force of a spring 23 compressed between disk 19 and another disk 24 which, likewise by the force of this spring, is maintained in engagement with a seat 25 raised around the inner end of the bore 15 of fitting 14. The piston member 17 divides the chamber 12 into a pair of compartments 26 and 27.

Through the top wall of casing 11, near its right-hand end, is an opening 28 which is provided with a tubular fitting 29 for a pipe 30. The disk 24, being biased into engagement with its seat 25, serves as a check valve which prevents leakage of fluid from compartment 26 into the passage 15, but permits flow of fluid in the opposite direction when the fluid pressure in passage 15 is substantially greater than that in chamber 26; the margin of disk 24 beyond seat 25 being notched, as indicated at 31, to aid such flow.

The other disk 19 serves both as a closure for the vent 16 and also, when the fluid pressure in compartment 26 is substantially greater than that in compartment 27, as a stationary valve-part relative to which the hollow outer part 18 of piston member 17 is movable to constitute a check valve whereby fluid can pass from compartment 26 to compartment 27 and outlet 28 when the shoulder 20 of the outer part 18 is moved out of engagement with disk 19 under the fluid pressure acting on the piston member; the fluid flowing through the interior of part 18 and around the edge of disk 19 which is notched, as shown, to aid the flow.

Mounted in an opening through the top wall of compartment 26 is a pilot valve, generally indicated at 32, comprising a port member 33 with which a spherical closure 34 cooperates; the closure being surrounded by a slotted collar 35. The closure 34 is shown as being held in port-closing position by an arm or armature 36 pivoted on a bracket 37 attached to the casing and attracted by an electromagnet a portion of whose core is indicated at 38. The armature 36 is biased in clockwise direction by a spring 39 so that when the electromagnet is deenergized the armature is rocked into engagement with a stop-pin 40 and the closure 34 is then free to rise from its seat under the pressure of fluid in the compartment 26 below it.

When the pilot valve 32 is opened the compartment 26 is vented so that fluid under pressure in the other compartment 27 is effective to move the piston member 17, as a unit, toward the left; the fluid then escaping from compartment 27 through the uncovered vent 16.

The valve structure of Fig. 2 is identical with that shown in Fig. 1 except in regard to the piston member which, as indicated at 41 in Fig. 2, is of one-piece construction and is provided with a restricted opening 42 continuously interconnecting the compartments 26 and 27; the central part of the end wall of the piston member 41 serving as a closure for vent 16, in the same manner as does the disk 19 of the piston member 17 in Fig. 1. The other elements in Fig. 2 have therefore been assigned the same reference numerals as in Fig. 1.

The hydraulic operator shown in Fig. 3 comprises a base 50 to which an inverted cup-shaped housing 51 is secured to provide a reservoir for the hydraulic fluid indicated at 52. Immersed in the fluid in the reservoir is a fluid-pressure motor which comprises a hollow cylinder 53 and cooperating plunger 54, the cylinder projecting integrally from the base and having a cover or head 55. The plunger 54 is biased in upward direction by the force of a compression spring 56 below it and has a stem 57 which extends through an opening in the base for connection to apparatus to be operated; a stuffing box 58 being provided for preventing leakage around the stem of fluid from the lower part of cylinder 53 which communicates with the reservoir by way of an opening 59.

Connected by pipe 30 to the space below head 55 of the fluid-pressure motor is a valve structure indicated at 60 and corresponding to the structure shown in either Fig. 1 or Fig. 2. The electromagnet core 38, with which the pilot-valve armature 36 cooperates, is shown in Fig. 3 surrounded by an energizing coil 61. The rod 62 seen in Figs. 1 and 2 projecting from passage 15, but not previously mentioned, is shown in Fig. 3 connected by a link 63 to a crank-pin 64 on the rotor 65 of an electric motor which comprises a core 66 and an energizing coil 67. The rod 62, when reciprocated by the motor, serves as a pump-piston whereby fluid, drawn from the reservoir through openings 68 when the piston is fully retracted, is forced past the check-valve disk 24 into the compartment 26 and thence past the check valve formed by the parts 18—19 of the piston member 17 and described above in connection with Fig. 1 (or through the restricted opening 42 in the arrangement of Fig. 2) into compartment 27 and thence through opening 28 and pipe 30 to the space above the motor-plunger 54 to force the same downwardly against the bias of spring 56.

The electromagnet coil 61 is electrically connected by wires 69 to terminals 70 and 71 which extend through insulating bushings in the base 50, the coil 67 of the electric motor being connected to the terminal 70 and to a third terminal 72. The terminals 70 and 71 are connected by wires 73, and through a switch 74, to a conventional source of A. C. current indicated by the symbol. The motor terminal 72 is connected to a resilient contact arm 75 which cooperates with a contact 76 carried by an arm 77 pivotally supported at its left-hand end and connected at its other end to the motor stem 57; contact 76 being connected by a flexible wire 78 to the lower terminal of the electric source.

In Fig. 3 the switch 74 is closed, so that the coil 61 is energized and the pilot-valve armature 36 therefore held in attracted and valve-closing position, as is shown in all the figures. However, the coil 67 of the electric motor is not energized since there is a small gap between contact 76 and contact arm 75 whose downward movement is arrested by a stop-pin 79; this condition being due to the overtravel of the motor stem 57 when it was previously operated. If, in time, leakage of fluid from the space above plunger 54 should occur in an amount sufficient to effect such rise of the motor stem that contact 76 were to engage arm 75, the circuit of the electric motor would be closed and the same operated for a brief period to pump more fluid into the pressure motor and restore the parts to the positions shown.

To effect upward movement of the motor stem 57 under the force of spring 56, the switch 74 is opened so that the pilot-valve electromagnet (as well as the electric motor) is deenergized and armature 36 released. Under the pressure of fluid in the pressure motor and compartment 27, acting through piston member 17 or 41, fluid from chamber 26 is then forced or vented to the reservoir through the pilot valve, and the concurrent movement to the left of the piston member effects uncovering of the vent 16 so that the fluid is quickly discharged from the motor as its plunger rises under the force of spring 56. In the upward movement of stem 57 and arm 77 the resilient contact arm 75 is engaged by contact 76 and carried therewith.

In the valve structure of Fig. 2 the flow capacity of opening 42 in the piston member 41 is small in relation to that of the pilot valve, so that when the pilot valve is opened the pressure difference established between chambers 27 and 26 is effective for movement of the piston member. The force of spring 23 need be only sufficient to return the piston member to its seat on vent 16.

When the switch 74 is again closed the pilot valve 32 is closed by its electromagnet, and the electric motor is operated (its circuit now being complete through contacts 75—76), so that the parts are restored, in the manner previously described, to the positions shown in the drawing.

The simple one-piece form of piston member shown in Fig. 2 is adapted for use if slow operation of the pressure motor, when the fluid is supplied thereto, is permissible or desirable. However, the combination piston and check valve of Fig. 1 is obviously more suitable if it is desired to operate the motor at relatively high rate upon the application of pressure.

Since only a small amount of fluid need be vented from compartment 26 to effect virtual full-opening of the motor-vent 16, the pilot valve 32 can be of a size which requires only a small amount of electrical energy for its operation.

To ensure against leakage of fluid from the valve structure it is advisable to provide the check valve cooperating with the inlet passage 15, even if the pressure source or pump is designed to close that passage when not in operation.

The specific embodiments of our invention herein shown and described are obviously susceptible of modification without departing from the spirit of the invention, and we intend therefore to be limited only by the scope of the appended claims.

We claim as our invention:

1. In a valve structure for conveying fluid from a pressure source thereof to a motor operable in one direction by the fluid, as well as for controlling discharge of such fluid from the motor to effect operation of the motor in an opposite direction: a casing having a chamber; means forming a partition dividing said chamber into a first and a second compartment and being movable in opposite directions in response to reversal of fluid pressure difference in the compartments; said casing having a fluid supply passage leading to said first compartment and a motor supply passage leading from said second compartment; means forming a restricted passage continuously interconnecting said first and second compartments whereby fluid from said supply passage can pass to the second compartment; means defining a vent for said second compartment; valve means operated by movement of said partition for controlling flow through said vent, the arrangement being such that when the fluid pressure in said first compartment becomes substantially less than that in the second compartment the resultant movement of the partition effects opening of the vent to permit discharge of fluid from the second compartment; and a pilot valve for so venting said first compartment as to effect said vent-opening movement of the partition.

2. In a valve structure for conveying fluid from a pressure source thereof to a motor operable in one direction by the fluid, as well as for controlling discharge of such fluid from the motor to effect operation of the motor in an opposite direction: a casing having an elongated cylindrical chamber; means in said chamber forming a piston dividing the chamber into a first and a second compartment; said casing having a first fluid supply passage extending axially from said first compartment and a second motor supply passage leading from said second compartment; a vent passage for said second compartment extending axially therefrom; said first passage and said vent passage each having a valve seat at its inner end, said valve seats facing each other; closure means on said piston-forming means engageable with said vent-passage seat; additional closure means, movable independently of said piston-forming means, engageable with said first-passage seat; resilient means urging said piston-forming means and said additional closure means in opposite directions toward seated position; said piston-forming means including means permitting passage of fluid from said first to said second compartment when the pressure of the fluid in the first compartment is greater than that in the second; and a pilot valve for venting said first compartment so that pressure of fluid in said second compartment can effect vent-passage-opening movement of the piston-forming means, said pilot valve being of relatively large flow capacity and connected directly to the first compartment so that it is capable of performing its function regardless of the position of said additional closure means.

3. A valve structure as defined in claim 2, and wherein said closure means on said piston-forming means is movable relative to the remainder of the piston-forming means and arranged so that said remainder constitutes a check valve whereby said passage of fluid from the first to the second compartment is permitted.

4. In a valve structure for conveying fluid from a pressure source thereof to a motor operable in one direction by the fluid, as well as for controlling discharge of such fluid from the motor to effect operation of the motor in an opposite direction: a casing having an elongated cylindrical chamber; means in said chamber forming a piston dividing the chamber into a first and a second compartment; said casing having a first fluid supply passage extending axially from said first compartment and a second motor supply passage leading from said second compartment; a vent passage for said second compartment extending axially therefrom; said first passage and said vent passage each having a valve seat at its inner end, said valve seats facing each other; said piston-forming means comprising a central portion having a surface engageable with said vent-passage seat, and a relatively-movable outer annular portion having an inwardly-directed flange engageable with the margin of said central portion around its seat-engaging surface and facing the vent-passage seat, said portions being arranged to form a check valve for passage of fluid from said first to said second compartment when the pressure in the first compartment exceeds that in the second, said piston-forming means including a spring urging said portions to interengagement; a closure, movable axially of said chamber and independently of said piston-forming means, engageable with said first-passage seat; a spring compressed between said closure and said central portion of the piston-forming means and urging the same in opposite directions toward seated position; and a pilot valve for venting said first compartment so that pressure of fluid in said second compartment can then effect vent-passage-opening movement of the piston-forming means.

References Cited in the file of this patent
UNITED STATES PATENTS

| | | |
|---|---|---|
| 900,639 | Aikman | Oct. 3, 1908 |
| 1,169,303 | Turner | Jan. 25, 1916 |
| 2,124,407 | Stroup | July 19, 1938 |
| 2,138,988 | Thomas | Dec. 6, 1938 |
| 2,270,549 | Orr | Jan. 20, 1942 |
| 2,399,294 | Ray | Apr. 30, 1946 |
| 2,404,796 | Grant et al. | July 30, 1946 |
| 2,459,613 | Baker | Jan. 18, 1949 |